(No Model.) 5 Sheets—Sheet 1.
A. F. BROWN.
GRAIN DRILL.
No. 455,470. Patented July 7, 1891.
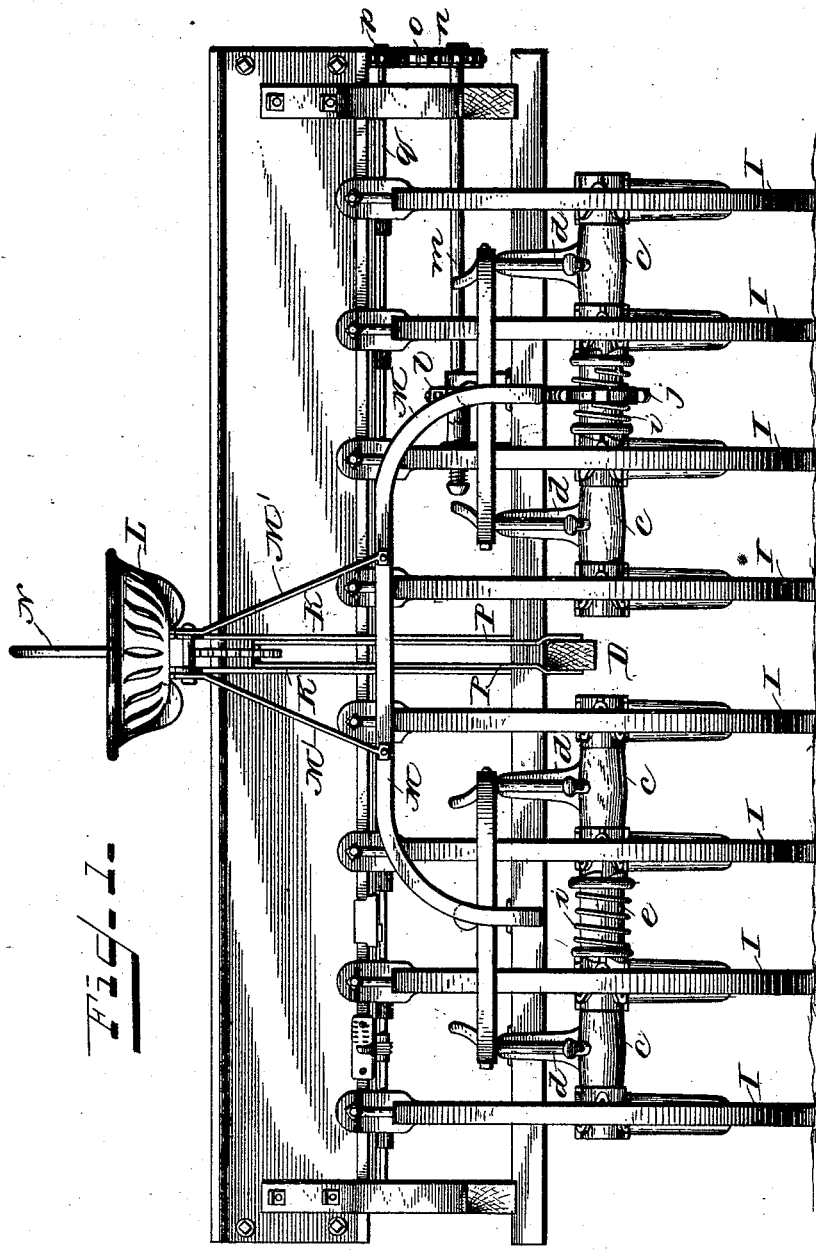
Witnesses
J. Thomson Cross.
Charles Dillon.
Inventor.
Arthur F. Brown
per Peck & Rector
his Attorney.

(No Model.) 5 Sheets—Sheet 2.
A. F. BROWN.
GRAIN DRILL.
No. 455,470. Patented July 7, 1891.
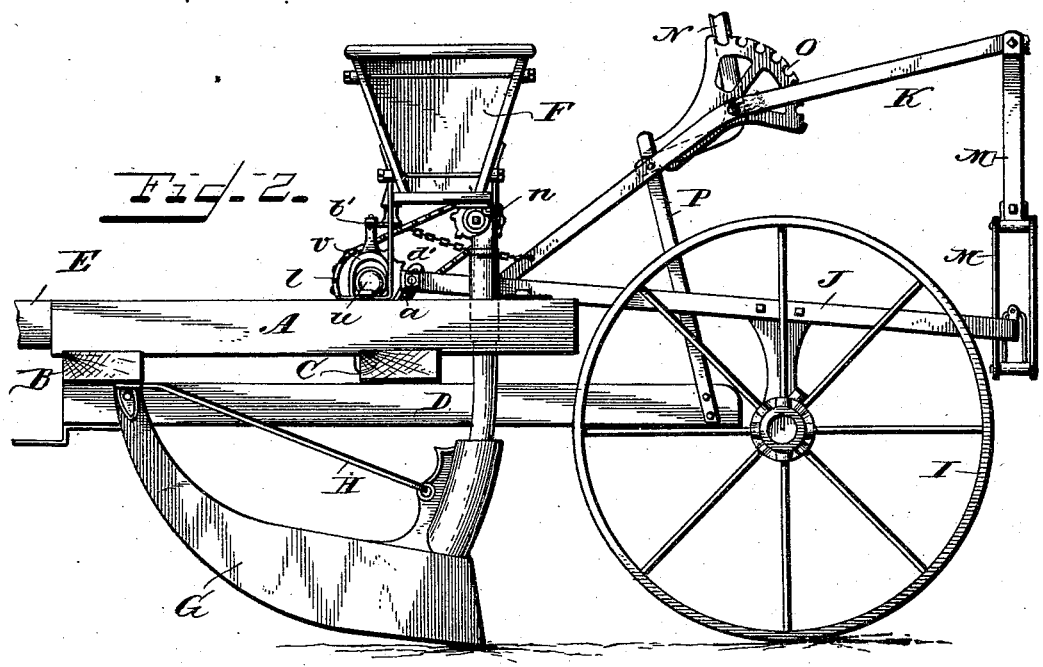
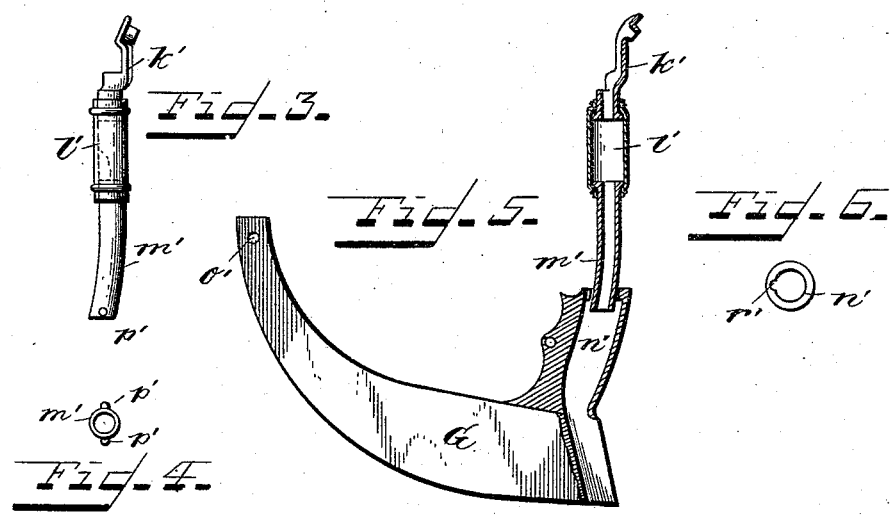
Witnesses.
J. Thomson Cross,
Charles Billon.
Inventor.
Arthur F. Brown
per Peck & Rector
his Attorneys.

(No Model.)  5 Sheets—Sheet 3.
A. F. BROWN.
GRAIN DRILL.
No. 455,470.  Patented July 7, 1891.
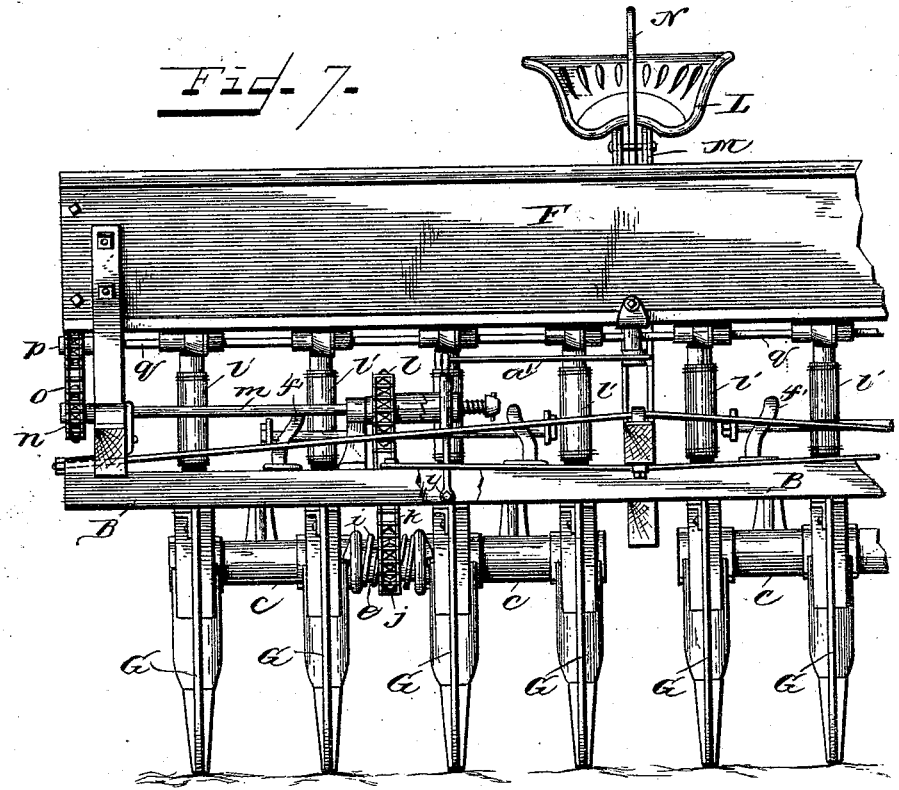
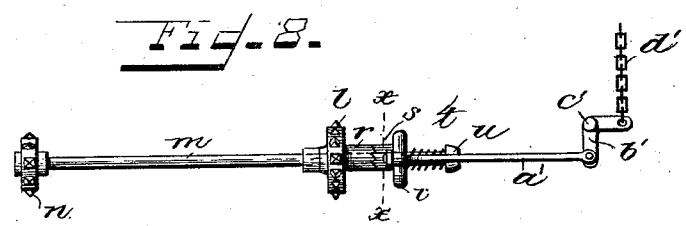
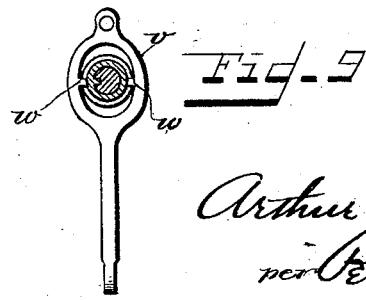
Witnesses:
J. Thomson Cross
Charles Billon
Inventor:
Arthur F. Brown
per Peck & Rector
Attorneys (No Model.)  5 Sheets—Sheet 4.
A. F. BROWN.
GRAIN DRILL.
No. 455,470.  Patented July 7, 1891.
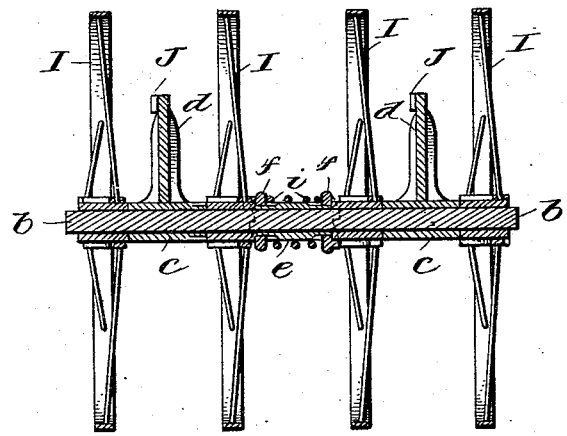
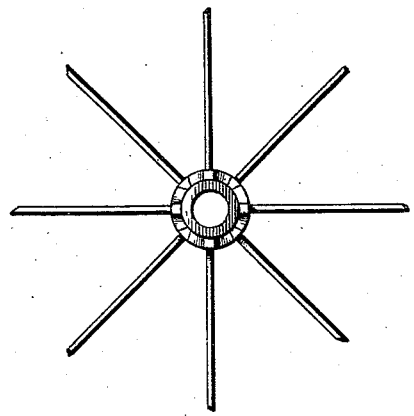
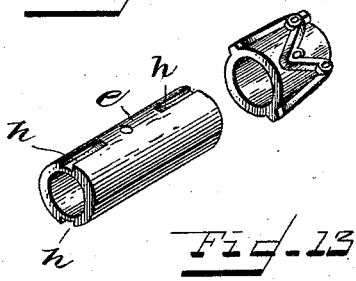
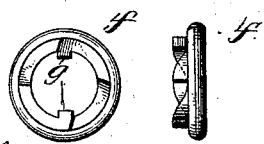
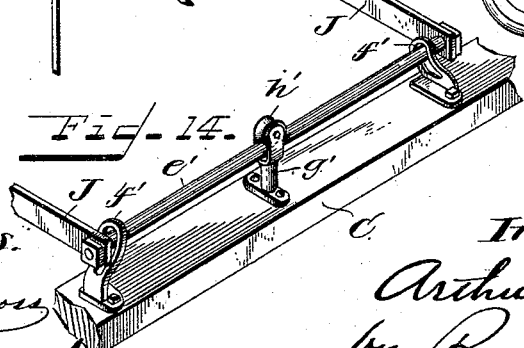
Witnesses.  Inventor.
J. Thomson Cross  Arthur F. Brown
O. S. Wentworth  by Recks & Rector
  his Attorneys.

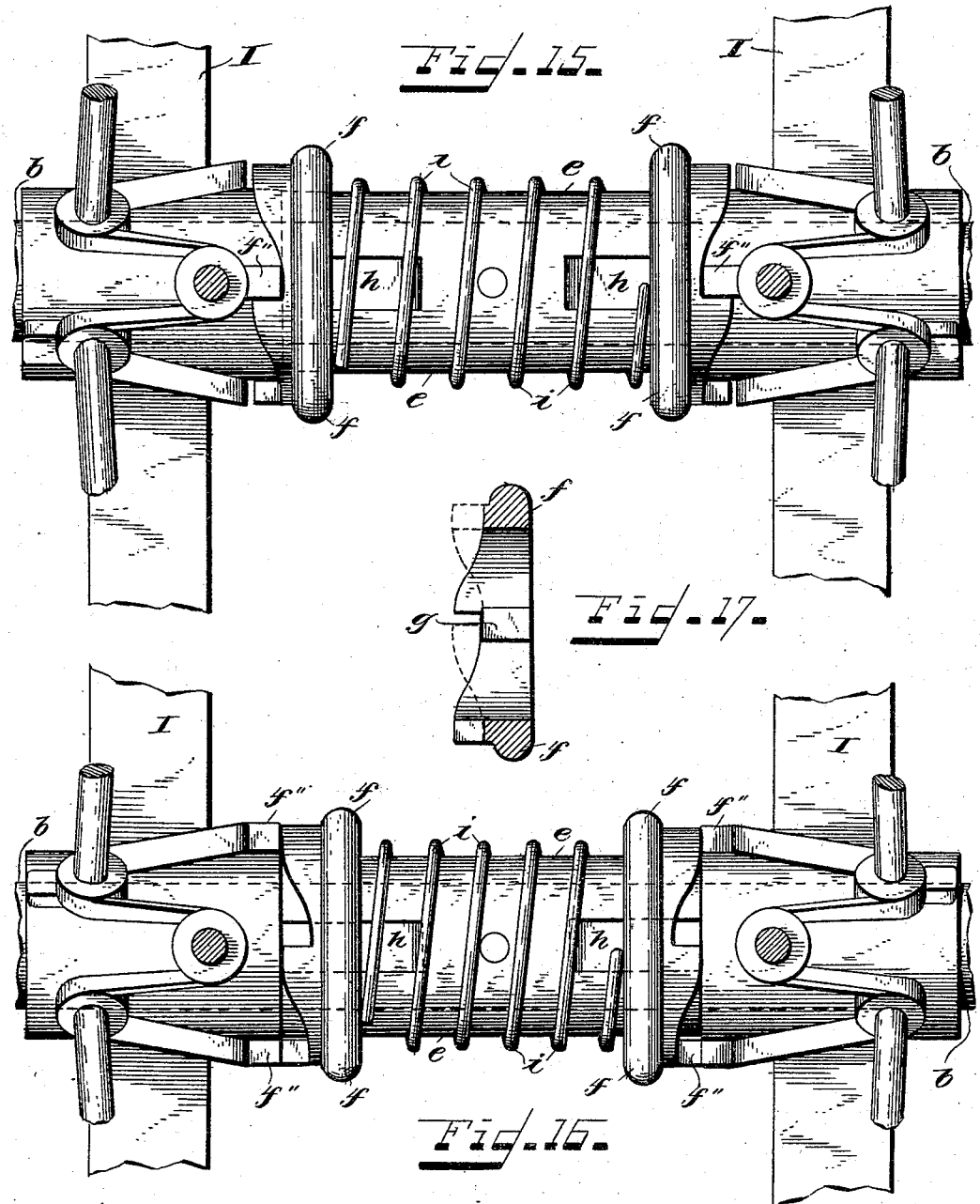

UNITED STATES PATENT OFFICE.

ARTHUR F. BROWN, OF DAYTON, OHIO, ASSIGNOR TO THE STODDARD MANUFACTURING COMPANY, OF SAME PLACE.

GRAIN-DRILL.

SPECIFICATION forming part of Letters Patent No. 455,470, dated July 7, 1891.

Application filed November 19, 1890. Serial No. 371,963. (No model.)

*To all whom it may concern:*

Be it known that I, ARTHUR F. BROWN, a citizen of the United States, residing at Dayton, in the county of Montgomery and State of Ohio, have invented certain new and useful Improvements in Grain-Drills, of which the following is a full, clear, and exact description, reference being had to the accompanying drawings, forming part of this specification.

My invention relates to that class of grain-drills now known to the trade as "press-drills," in which each runner which opens the furrow in which the grain is dropped is followed by a press-wheel, which presses or packs the earth firmly onto the grain, thereby retaining the moisture in the soil and causing the grain to germinate quickly.

The object of my invention is to improve the construction and efficiency of this class of drills, and its novelty will be hereinafter set forth, and specifically pointed out in the claims.

In the accompanying drawings, Figure 1, Sheet 1, is a rear elevation of a drill embodying my invention. Fig. 2, Sheet 2, is a side elevation of the main body of the same. Fig. 3, Sheet 2, is an elevation of one of the feed-spouts. Fig. 4, Sheet 2, is a bottom plan view of the feed-spout. Fig. 5, Sheet 2, is an elevation, partly in section, of one of the runners and its shank. Fig. 6, Sheet 2, is a detail plan view of the top of that part of the feed-spout secured to the runner. Fig. 7, Sheet 3, is a front elevation of little more than half of the machine. Fig. 8, Sheet 3, is a detail plan view of the feed-driving and disconnecting mechanism. Fig. 9, Sheet 3, is an enlarged sectional view through the dotted line X X of Fig. 8, looking to the right. Fig. 10, Sheet 4, is a central axial section through a gang of press-wheels. Fig. 11, Sheet 4, is a side elevation of one of the press-wheels having a clutch-hub. Fig. 12, Sheet 4, is a perspective view of the clutch-sleeve. Fig. 13, Sheet 4, represents the clutch-collar in side and end elevation. Fig. 14, Sheet 4, is a detail perspective of the coupling for the draw-bar frames of the wheel-gangs. Fig. 15, Sheet 5, is an enlarged detail of the axle, two wheel-hubs, interposed sleeve, and clutches in position when the wheels are advancing. Fig. 16, Sheet 5, is a corresponding view showing the position of the clutch-rings when the wheels are backing. Fig. 17, Sheet 5, is an enlarged central section of one of the clutch-rings.

The same letters of reference are used to indicate identical parts in all the figures.

The machine, like others of its class, has a front runner-frame composed of the two side bars A, front cross-bars B, and rear cross-bars C, all firmly and rigidly secured together. Attached to the upper part of this frame in the rear is the usual seed box or hopper F, provided on its under side with the usual or any suitable feed-wheels. Secured to the under side of the bar B are the runners G with their usual or any suitable springs H.

In the present instance there are eight runners and in rear of and in line with them eight press-wheels I in gangs of four, each gang being attached to and carried by a U-shaped metal frame M, constituting draw-bars J, the front ends of which are pivoted, as at $a$, Fig. 2, to the cross-bar C.

K are the usual seat-supporting bars for the driver's seat L, and M' are the usual or any suitable distributing-arms extending from the seat-bars and pivoted at their lower ends to the middle of the draw-bar frames for throwing the weight of the driver equally on the two gangs of press-wheels.

N is the usual lock hand-lever, held in any position by the segment-rack O and connected by a link or links P to the rear end of the central bar D for raising or lowering the runner-frame as usual in this class of machines.

The wheel gang-axles $b$, Fig. 10, are journaled in sleeves $c$, forming part of hangers $d$, secured to and extending down from the draw-bars T. The outer wheels I are loosely journaled upon the axle and the sleeves $c$ serve as spacing-spools between them and the two inner wheels. Between the two inner wheels is a sleeve $e$, Figs. 12, 15, and 16, pinned or fastened to the axle and having upon its end two ratchet-clutch rings or collars $f$, Figs. 13, 15, and 16, with lugs $g$ confined in slots $h$ in the sleeve $e$, so as to feather the clutch-rings upon the sleeve. The clutch-surfaces of the rings $f$ are held in engagement with clutch projections $f''$, Figs. 15 and 16, upon the inner hubs of the two inner wheels I by means of a coiled spring $i$, surrounding the sleeve $e$ and bearing against the inner sides of the rings, as shown. By this construction the two inner wheels impart rotation to the axle as the machine advances, thereby causing the natural wear to occur in the sleeves $c$, which can be properly oiled, and not in the eyes of the wheels, which would make them wabble and track badly, while at the same time in backing or turning all of the wheels are independent and free to turn without rotating the axle, as in backing the inner wheel-hubs would slip back upon the clutch-rings and merely press them inward upon the sleeve $e$, as will be readily understood, and as seen in Fig. 16.

The construction heretofore of press-wheels for this class of machines has been of three kinds—namely, plain wheels to be used where no clutch is desired; secondly, right clutch-wheels to be used in connection with and to the right of a clutch fastened rigidly to the axle, and, thirdly, left clutch-wheels to be used in connection with and to the left of a clutch fastened rigidly to the axle. By my construction I am enabled to make all the press-wheels alike, and avoid the constant annoyance and mistakes caused by using three kinds of wheels.

Another advantage of my construction is that each wheel can be turned backward, as in backing up or turning around, without having any lateral movement on the axle. In addition to these functions I am enabled, with the other or right-hand gang-axle, to drive the seed mechanism by the draft or traction of two of the press-wheels—in this instance the inner ones—by placing a sprocket-wheel $j$, Figs. 1, 2, and 7, upon the sleeve $e$ and connecting it by a drive-chain $k$ to a sprocket-wheel $l$ upon a counter-shaft $m$, having at its end a second sprocket-wheel $n$, connected by a drive-chain $o$ to a sprocket-wheel $p$ upon the end of the feed-wheel shaft $q$, thus imparting the forward rotation of the gang-axle on that side of the machine to the feed-wheel shaft.

To prevent the rotation of the feed-wheel shaft while the machine is advancing with its runner-frame lifted, as in turning around at the end of each row or as in transporting it from the barn to the field, I secure the sprocket-wheel $l$ loose upon the shaft and provide it with an inner clutch-hub $r$, Figs. 7, 8, and 9, which is normally engaged by a clutch-sleeve $s$, feathered upon the shaft $m$ and pressed forward into engagement by a coiled spring $t$, confined between it and a collar $u$ upon the end of the shaft. Surrounding the sleeve $s$ is a shifter-ring $v$, with inwardly-extending lugs or pins $w$ engaging a circumferential groove in the sleeve $s$ and having a lower extension pivoted, as at $y$, Fig. 7, to the beam C. A rod $a'$ connects the upper end of the ring $v$ with a bell-crank $b'$, pivoted, as at $c'$, to the hopper and having a chain $d'$ extending back from its opposite end and made fast to any part of the press-wheel frame—in this instance to the seat-beam K—so that the lifting of the runner-frame draws this chain taut, and through the medium of the bell-crank and rod $a'$ draws back the ring $v$ and disengages the clutch-sleeve $s$ from the hub $r$, thereby permitting the sprocket $l$ to run loose upon the shaft $m$ without rotating the same. Upon lowering the runner-frame the chain $d'$ is slackened and the spring $t$ again engages the sleeve $s$ and hub $r$ to lock the sprocket $l$ to its shaft $m$, as will be readily understood.

The connection of the U-shaped draw-bar frame to the runner-frame will be readily understood by reference to Fig. 14, where the front ends of each pair of draw-bars is connected by a rod $e'$, which is passed through vertical slots in brackets $f'$, secured upon the beam C just inside the draw-bars, and through a central forked bracket $g'$, having pivoted between its forks a grooved or straight roller $h'$, bearing upon the top of the rod $e'$. In this manner the forked bracket $g'$ serves as a fulcrum upon which the draw-bar frame can tip, the slots in the brackets $f'$ affording sufficient play for the rod $e'$.

The remaining feature of my invention, relating to the feed-spouts, is illustrated in Figs. 2, 3, 4, 5, and 6, where $k'$ is the fixed metal-receiving end of the spout, bolted to the rear side of the hopper right under the discharge-opening of the feed-wheel, and having upon its lower end a short rubber tube $l'$, into the lower end of which is inserted a curved metal tube $m'$, forming part of the spout, and whose lower end is inserted and telescopes within that part of the spout consisting of the crank $n'$, carried by the runner G.

Heretofore that part of the feed-spout which is connected with the runner-shank has been of rubber and the constant up-and-down play of the runner soon wore out the spout, but by my construction I gain all the flexibility required for the spout by the short rubber tube $l'$, and the lower telescoping parts are made of metal, which can withstand the wear. It will be noticed that the curvature of the telescoping parts is struck from the hinging point $o'$, Fig. 5, of the runner as a center.

To prevent the accidental disengagement of the tubes $m'\ n'$, I provide one or more pins or detents $p'$ on the lower part of the tube $m'$, which are inserted through an opening $r'$, Fig. 6, in the top flange of the tube $n'$ and engage upon the outer side of said flange when the tube $m'$ is partially turned in the manner of a bayonet-joint, though the telescoping of the two tubes is not prevented. By this close connection of the tube $m'$ with the shank $n'$ the dirt carried over by the press-wheels cannot be thrown into the shank, as frequently happens when the upper end of the shank is enlarged and open.

Having thus fully described my invention, I claim—

1. In a grain-drill, a press-wheel having a hub whose outer face is adapted to bear against a sleeve fast on the axle and having on said hub a clutch adapted to be engaged by a yielding clutch carried upon said sleeve, substantially as described.

2. In a grain-drill, a press-wheel having a hub whose outer face forms a bearing and having a clutch-surface, in combination with the axle, a sleeve fast upon said axle and bearing against the hub of the press-wheel, and a yielding feathered clutch-ring carried by said sleeve and engaging the clutch-surface on the hub, substantially as described.

3. In a grain-drill, a gang of press-wheels, an axle upon which said wheels are journaled, interposed spacing-sleeves upon the axle to hold the press-wheels from lateral movement, and yielding clutch mechanism interposed between one or more of the hubs of the press-wheels and one or more of the sleeves fast to the axle, substantially as described.

4. In a grain-drill having a front runner-frame and gangs of press-wheel frames hinged thereto, the combination, with the wheels and axle of each gang, of a sleeve fast to the axle and provided with feathered yielding clutch-rings engaging clutch-faces upon the hubs of the adjacent press-wheels, substantially as and for the purpose described.

5. In a grain-drill having a front runner-frame and gangs of press-wheel frames hinged thereto, the combination, with the wheels and axle of each gang, of a sleeve fast to the axle and provided with feathered yielding clutch-rings engaging clutch-faces upon the hubs of the adjacent press-wheels, and a drive-wheel fast upon said sleeve, substantially as and for the purpose described.

6. In a grain-drill having a front runner-frame and gangs of press-wheels hinged thereto, the combination of a driving-wheel locked to the axle of one of the press-wheel gangs during the forward rotation of said axle, a counter-shaft upon the runner-frame connected with the feed-shaft, a drive-wheel loose upon said counter-shaft and driven by a connection between said wheel and the driving-wheel on the axle of the press-wheel gang, a clutch between the wheel on the counter-shaft and said shaft, a shifter for operating said clutch, and mechanism connecting said shifter with the seat or press-wheel frame, whereby upon raising the runner-frame the shifter causes the disengagement of the clutch, substantially as and for the purpose described.

7. In a grain-drill having a front runner-frame and gangs of press-wheel frames hinged thereto, the combination of a driving-wheel locked to the axle of one of the press-wheel gangs during the forward rotation of said axle, a counter-shaft upon the runner-frame connected to the feed-wheel shaft, a drive-wheel loose upon said counter-shaft and driven by a connection with the driving-wheel of the axle of the press-wheel gang and provided with a clutch-hub, a clutch-sleeve feathered upon said counter-shaft and engaging said clutch-hub by spring action, a shifter for said clutch-sleeve, and mechanism connecting said shifter with the seat or press-wheel frame, whereby upon raising the runner-frame the shifter causes the disengagement of the clutch-sleeve and clutch-hub, substantially as and for the purpose described.

8. The combination and arrangement of the sprocket-wheel $j$, chain $k$, counter-shaft $m$, sprocket-wheel $n$, chain $o$, sprocket-wheel $p$, feed-shaft $q$, sprocket-wheel $l$, loose upon the shaft $m$ and having the clutch-sleeve $s$ feathered upon the shaft $m$, spring $t$, shifting-ring $v$, engaging the clutch-sleeve, rod $a'$, bell-crank $b'$, and chain $d'$, substantially in the manner and for the purpose described.

9. The combination, with the runner G, having the shank $n'$, of the feed-spout composed of the upper metal tube $k'$, intermediate rubber tube $i'$, and lower metal tube $m'$, telescoped within the shank $n'$, substantially as and for the purpose described.

10. The combination, with the runner G, having the shank $n'$ with an inturned flange at its upper end, of the feed-spout having its lower end of metal and telescoped within the shank $n'$ and provided with a locking pin or pins $p'$, substantially as and for the purpose described.

ARTHUR F. BROWN.

Witnesses:
 WARREN HALL,
 H. A. CRANDALL.